(12) United States Patent
Noyes

(10) Patent No.: US 6,691,916 B2
(45) Date of Patent: Feb. 17, 2004

(54) AUTOGRAPH VERIFICATION AND AUTHENTICATION SYSTEM

(76) Inventor: Frederick D. Noyes, 511 Bar Harbor Rd., Trenton, ME (US) 04605

( * ) Notice: Subject to any disclaimer, the term of this patent is extended or adjusted under 35 U.S.C. 154(b) by 399 days.

(21) Appl. No.: 09/774,386

(22) Filed: Jan. 30, 2001

(65) Prior Publication Data

US 2001/0033676 A1 Oct. 25, 2001

Related U.S. Application Data

(60) Provisional application No. 60/180,706, filed on Feb. 7, 2000.

(51) Int. Cl.[7] .................................................. G06K 5/00
(52) U.S. Cl. .......................... 235/382; 235/380; 283/70; 283/86
(58) Field of Search ..................... 235/382, 380; 283/70, 67, 74, 86, 7, 72

(56) References Cited

U.S. PATENT DOCUMENTS

| | | | | |
|---|---|---|---|---|
| 3,711,177 A | * | 1/1973 | Ward | 250/550 |
| 4,368,979 A | * | 1/1983 | Ruell | 356/71 |
| 4,889,367 A | * | 12/1989 | Miller | 283/88 |
| 5,380,047 A | | 1/1995 | Molee et al. | |
| 5,509,692 A | * | 4/1996 | Oz | 283/70 |
| 5,737,886 A | * | 4/1998 | Kruckemeyer | 283/67 |
| 5,920,058 A | | 7/1999 | Weber et al. | |
| 5,971,435 A | | 10/1999 | DiCesare et al. | |
| 6,082,774 A | | 7/2000 | Schlauch | |
| 6,250,549 B1 | * | 6/2001 | DeFabio, Jr. | 235/380 |
| 6,309,690 B1 | * | 10/2001 | Brogger et al. | 427/7 |

\* cited by examiner

*Primary Examiner*—Michael G. Lee
*Assistant Examiner*—Seung H Lee
(74) *Attorney, Agent, or Firm*—Pierce Atwood

(57) ABSTRACT

An autograph verification and authentication process. The process includes having a representative of an authentication system provider witness an individual autographing an item and generate a unique label for each signed item. The tamper-proof label includes two forms of coding. The first is visible and provides unique identifying information. The second one is embedded and can only be observed by the authentication service provider. The second code includes the unique identifying information as well. The label includes Information associated with the signing and that information may be entered into a database. The process further includes the step of having the individual sign a statement that identifies the items(s) signed, the date and location of the signing, and reference to the label(s) affixed to the item(s). The unique information may be accessed through the database under control of the provider.

14 Claims, 3 Drawing Sheets

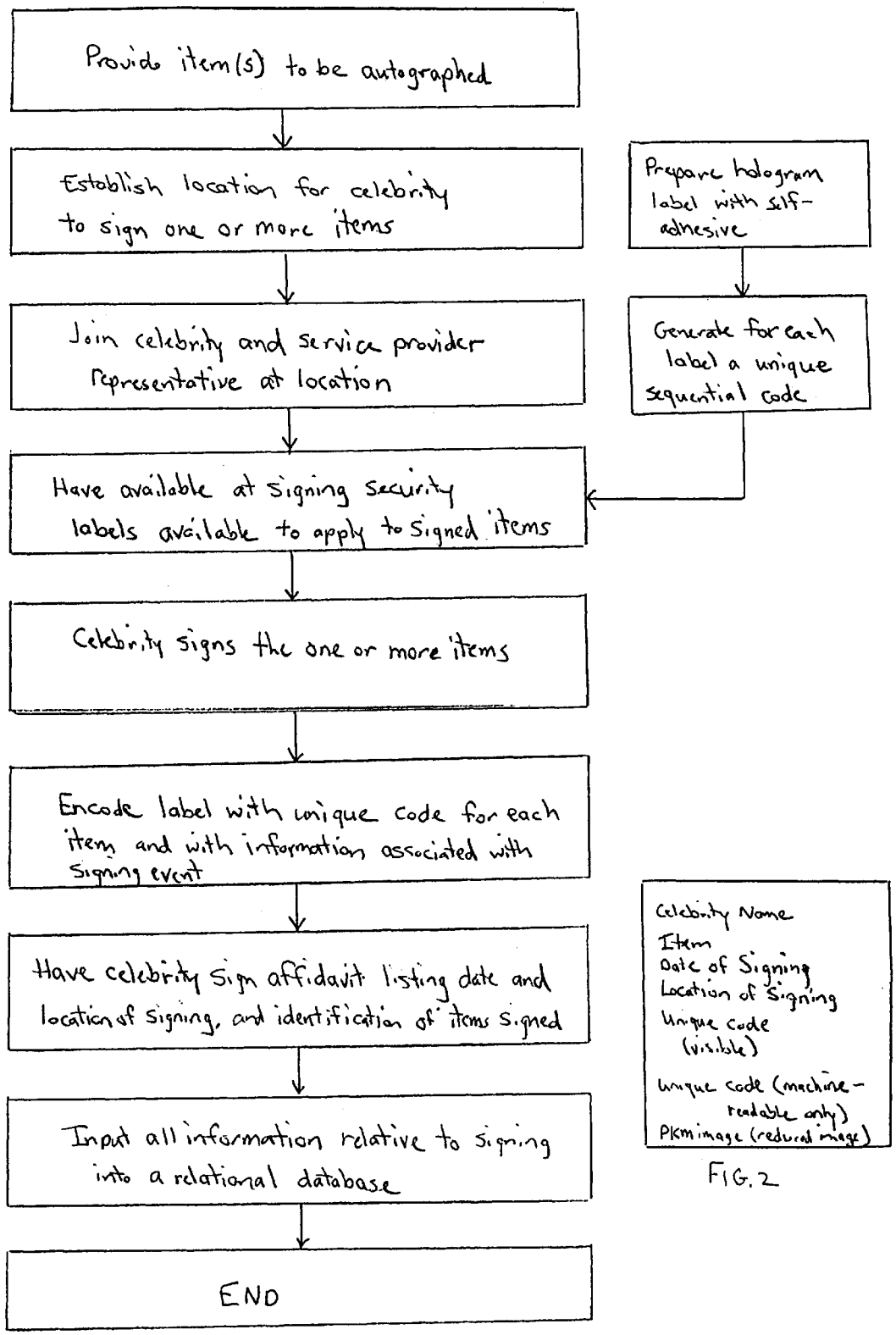

AUTOGRAPH VERIFICATION AND AUTHENTICATION SYSTEM

CROSS-REFERENCE TO RELATED APPLICATION

This application claims the priority benefit of U.S. provisional patent application Ser. No. 60/180,706, filed Feb. 7, 2000, of the same title and by the same inventor.

BACKGROUND OF THE INVENTION

1. Field of the Invention

The present invention relates to techniques and systems for verifying and authenticating the signatures of well-known personalities. More particularly, the present invention relates to a comprehensive autograph authentication system that involves the cooperation of each signatory, a process for independent confirmation of the signing, and a tamper-proof labeling system unique for each autographed item.

2. Description of the Prior Art

The field of autograph collection is a significant one, involving the exchange of such collectibles for ever-increasing fees. The autographs of interest run the range from sports personalities to politicians. As might be expected, the price that can be charged for a particular autographed item is dependent upon the celebrity of the personality, the item, and the rarity of the autograph, among other parameters. Needless to say, the money associated with this activity has generated a substantial industry in forged signatures. In fact, there are likely more items available for purchase having forged or faked rather than authentic signatures thereon. The availability of forgeries or fakes necessarily harms the celebrity whose signature has been passed off, both in terms of reputation and financial loss. As importantly, it harms the consumer who purchases the item with the false belief that the signature is real. That person has expended money-sometimes a significant amount—in order to purchase a worthless product.

U.S. Pat. No. 5,971,435 issued to DiCesare et al. describes a system for verifying the authenticity of an autograph. The DiCesare system requires a consumer to witness the signing of an item by a celebrity. A voucher is then provided to the consumer to confirm the authenticity of the signature pursuant to the observation. The voucher includes identifying information as well as a code number. The code number is also applied to the signed article. A database of verified signings is then developed and is accessible to confirm the authenticity of a signing of a particular item that has been cataloged. In that regard, DiCesare ensures that a consumer who has viewed an autographing by a celebrity of a particular item can prove to others the authenticity of the autograph.

Unfortunately, there are several key limitations to the DiCesare system. First, it either requires the consumer, or two witnesses, to be present at the signing of the item to establish the authenticity. In the first instance, this can be an extremely difficult part of the process in that celebrities tend to be busy and the intersection of their availability and that of the particular consumer is likely to be quite small. While one could argue that such a restriction could be minimized at an organized signing for example, such an approach is unlikely to be suitable for such events where the goal ordinarily is to have the signings proceed as rapidly as possible. In the second instance, there remains no assurance that the "witnesses" are sufficiently reliable to ensure that they are not part of a scheme in which they claimed to have observed a celebrity signing that did not occur. That is, there still remains the possibility that a group of individuals will generate faked signed and witnessed items.

The witness reliability problem noted above leads to the second limitation of the DiCesare system. Specifically, there is insufficient reliability in the nature of the labeling system described in that patent. DiCesare fails to teach a verification system that ensures the labels themselves cannot be faked. There is no indication that the DiCesare system includes means for preventing a compromise of the integrity of the labeling. As a result, authentication labels could in turn be faked, rendering the whole system open to veracity complaints.

Therefore, what is needed is an autograph verification and authentication system that can establish with certainty that a celebrity has, in fact, signed a particular item. What is also needed is such a verification and authentication system that is sufficiently convenient for the celebrity and does not require the presence of the purchaser/holder of the signed item. Further, what is needed is an autograph verification and authentication system that includes tamper-proof means for establishing the authenticity of the signature. Moreover, what is needed is an autograph verification and authentication system that includes the step of having the celebrity sign an affidavit attesting to the signing of a specific item or set of items and having corresponding code associated therewith.

SUMMARY OF THE INVENTION

It is an object of the present invention to provide an autograph verification and authentication system that can establish with certainty that a celebrity has, in fact, signed a particular item. It is also an object of the present invention to provide such a verification and authentication system that is sufficiently convenient for the celebrity and does not require the presence of the purchaser/holder of the signed item. Further, it is an object of the present invention to provide an autograph verification and authentication system that includes tamper-proof means for establishing the authenticity of the signature. Additionally, it is an object of the present invention to provide an autograph verification and authentication system that includes the step of having the celebrity sign an affidavit attesting to the signing of a specific item or set of items and having corresponding code associated therewith.

These and other objects are achieved in the present invention by providing a comprehensive autograph verification and authentication system. The system includes the step of having a celebrity meet directly with a representative of a provider of the verification system of the present invention. At that time, upon having the celebrity sign an item or set of items, the representative affixes to the item a tamper-proof label unique to the item. The label is preferably created prior to the signing of the item or items but may alternatively be created at the time of the signing. The label includes two forms of coding. The first is a visible one that provides unique identifying information. The second one is not visible but is instead embedded within a hologram depiction and can only be observed by the authentication service provider. The label includes Information associated with the signing and that information is entered into a database of related information. The label may additionally include a pixelated kinetic matrix of a unique service provider image containing microtext information only readable by magnification. That matrix, in addition to the embedded information, ensures that the service provider is the only one able to read and qualify a particular portion of each label to verify its authenticity. This additional layer of protection ensures that counterfeiting cannot occur even if embedded information is not copied. Finally, the representative of the verification system provider obtains from the celebrity a signed statement that identifies the items(s) signed, the date and location of the signing, and reference to the label(s) affixed to the item(s). Having the celebrity sign a statement containing that information ensures that a specific item having a unique specific tamper-proof label is authentic.

In addition to the important step of having the celebrity sign a statement verifying the items signed, the tamper-proof label is an important aspect of the system of the present invention. Specifically, the label is designed to be destroyed or obviously altered in any attempt to remove it from the item. The label may be made of any damage-evident material but is preferably a hologram. In addition, the label includes digitally embedded coding, such as alphanumeric coding that is uniquely associated with the particular signed item. That coding may include the name of the celebrity, the date and location of the signing, and a sequential identifier unique to that label. The label may also include a portion of the noted information, preferably not including the unique sequential code, that is observable by the item owner without requiring special reading equipment. It is important to note that each signed item have a single unique code associated therewith to establish with certainty the uniqueness of that signed item.

The database of information related to the signed item and its associated coding is a preferred means to ensure consumers that an autograph is authentic. Specifically, using well-known database development means, a representative of the verification system provider records the details of a particular signing and the embedded coding applied to the labeling for the item. In addition, the names and addresses of witnesses to the signing may be included, as well as the information related to the signed affidavit from the celebrity, which affidavit is retained in a secured facility. The database may then be accessed by the system provider in order to confirm or refute the authenticity of a signed item, which access must be accompanied by a scanning of the label applied to the item. This database may be particularly useful if and when a particular signed item is transferred from one owner to another and the second owner wishes to verify the authenticity of the signature. That second purchaser may retain the service provider to access the database, review the item and its label, and establish with substantial certainty the authenticity of the autograph. Additionally, the celebrity may access the database to verify specific signings as desired.

These and other advantages of the present invention will become apparent upon review of the following description and the accompanying drawing.

BRIEF DESCRIPTION OF THE DRAWINGS

FIG. 1 is a simplified flowchart representation of the primary steps and components of the autograph verification and authentication system of the present invention.

FIG. 2 is a simplified front view of an exemplar tamper-proof label of the system of the present invention.

DESCRIPTION OF THE INVENTION

Figure 3:
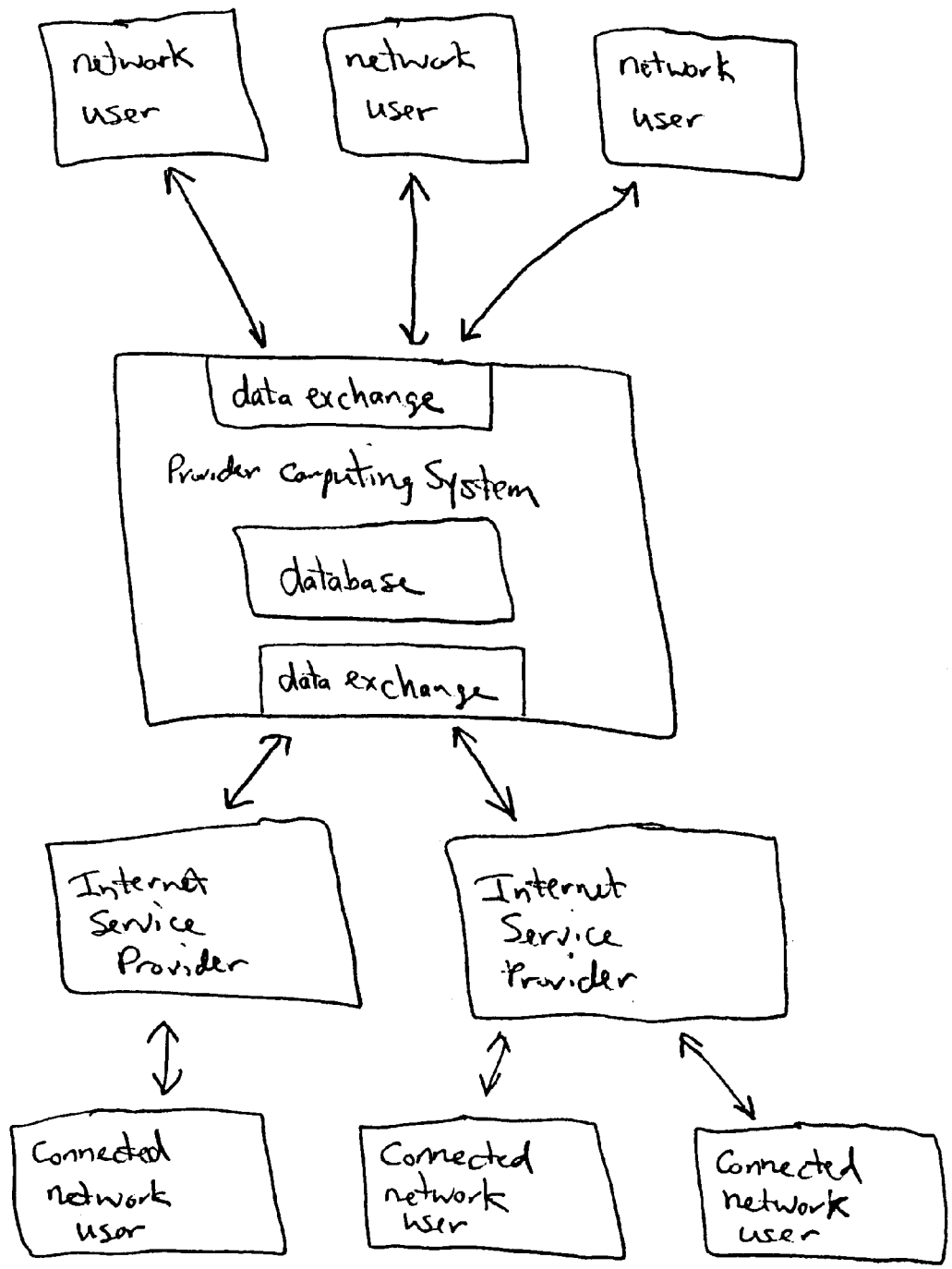
FIG. 3 is a simplified representation of an interconnected computer system including the autograph information stored in a database accessible through a website controlled by the authentication system provider.

An autograph verification and authentication system of the present invention is represented in FIG. 1. The system is a process including a series of steps related to the development of unique encoded tamper-proof labels and the formation of an expandable database. The first step in the process includes providing one or more items to be autographed. Such an item may be provided by the celebrity, the consumer interested in obtaining a signature, the verification system service provider, or a sponsor. The second step is identifying and establishing a location for the celebrity to conduct a signing. That location may be at the celebrity's office, for example, at a sponsor's chosen site, at the service provider's facility, or an alternative location. The third step of the system is joining the celebrity and one or more representatives of the service provider together at the location at a mutually acceptable time. It is important in the process that a representative of the service provider be at the location in order to maintain the integrity of the process.

The fourth step in the system is to have available at the signing event a sufficient number of tamper-proof encoded and encodeable security labels to ensure that each item to be signed has its own unique sequentially encoded alphanumeric security code. It can be seen from FIG. 1 that the security labels are preferably prepared on holographic material, which material includes a self-adhering adhesive and the appearance of which is readily identified as damaged in the event an attempt is made to remove it from the item. In addition, each security label is preferably encoded in advance with the unique code such that each label can be identified with one and only one item by that code. The unique code is preferably only machine-readable and can only be accessed through a keyed security system. The label may further include a pixelated kinetic matrix image unique to the service provider and readable only under magnification. Such a label arrangement may be obtained from CFC/Northern Bank Note, Security Holographics, Countryside, Ill.

The fifth step in the process is to have the celebrity sign each of the one or more items to be autographed. Next, a label is finalized for each item signed, preferably after each individual item is autographed. At this time, the additional information applied to the label may include the name of the celebrity, the date of the signing, the location of the signing, and the type of item signed. Of course, depending upon the particular situation, any of that information known in advance may be coded on the label in advance. In any event, visible as well as machine-readable-only information may be applied to the label.

The encoded label with a unique embedded security code is an important component of the system to ensure the authenticity of the autograph associated therewith. A representation of an exemplar label is shown in FIG. 2. For illustration purposes only, that drawing shows that the label may include for viewing with the naked eye, among other information, the name of the celebrity, the date of the signing, the location of the signing, and the particular item signed. Of course, it would have that information and the unique sequential code embedded and not visibly readable. It may additionally include the unique code in a readable form as well as a pixelated kinetic matrix image readable by magnification only.

Referring again to FIG. 1, after the items to be autographed by a particular celebrity have been signed, a key aspect of the present invention is the step of having the celebrity sign an affidavit related to the signing event. The affidavit would include a complete listing of the items signed by that celebrity. It would also include the date of the signing event, its location, and the celebrity's statement to the effect that the autograph is that of the celebrity on the items listed. If desired, a corresponding set of labels matching those applied to the individual items listed in the affidavit could be applied to the affidavit or otherwise retained by the service provider representative. The representative could optionally sign a corresponding affidavit.

The final step in the process of the present invention as represented in FIG. 1 involves inputting into a centralized database managed by the service provider the information associated with the signing event. That information would include, but not be limited to, the name of the celebrity, the name of the one or more obtainers of the item or items signed, if known, the date of the signing, the location of the signing, the items signed, and the unique sequential code associated with each item signed. That database of information may be used by the service provider to establish and maintain the integrity of the signing information in that only true autograph events would be recorded therein. The database could be accessed upon request from a celebrity, the original obtainer of the signed item, or a subsequent interested buyer. The party seeking verification of the authenticity of the autograph would either have to know and provide the unique sequential code or, preferably, the item in question. In the latter instance, the label could be observed by the service provider for evidence of tampering. Additionally, the label could be subjected to machine reading of the embedded code for evaluation.

Figure 4:
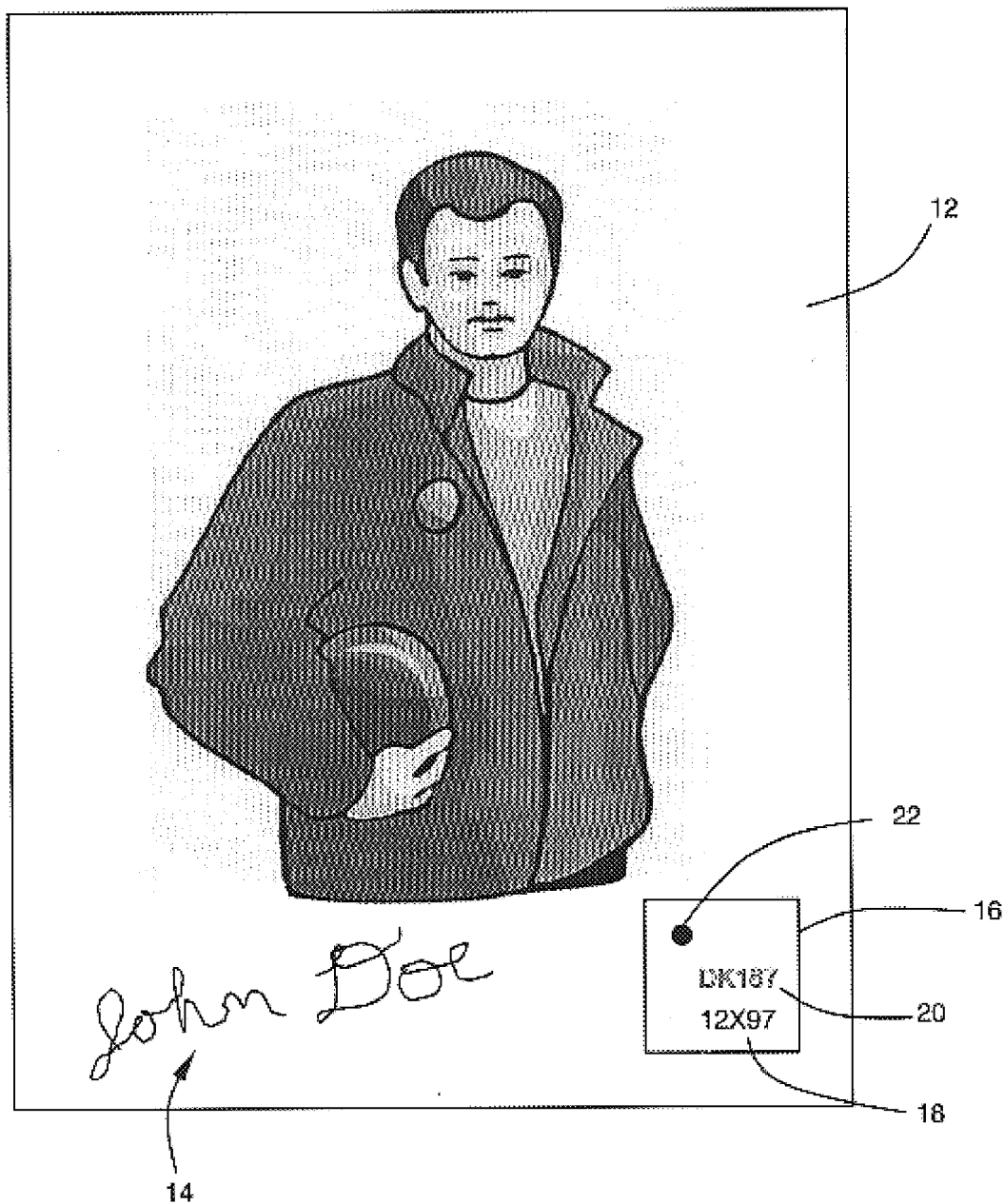
FIG. 4 shows a photograph of a celebrity including the celebrity's signature and an exemplar label of the system of the present invention.

Referring to FIG. 4, an article 12 (a photograph of a celebrity in this representative example) is shown. The article 12 has the celebrity's signature 14 written thereon. Also affixed to the article 12 is a label 16. As discussed above the label 16 is preferably prepared on holographic material, which material includes a self-adhering adhesive and the appearance of which is readily identified as damaged in the event an attempt is made to remove it from the item. In addition, the label 16 is provided with a first code 18 providing unique identifying information and a second code 20 providing unique identifying information. The first code 18 is visible with the naked eye, and the second code 20 is not visible with the naked eye. The second code 20 (which is shown in outline characters to represent its non-visible nature) is only machine-readable and can only be accessed through a keyed security system. The label 16 further includes a pixelated kinetic matrix image 22 unique to the service provider and readable only under magnification.

As illustrated in FIG. 3, the unique identifying information including the relevant coding information for each autographed item may be stored in the database. That database is retained on a computing system controlled by the authentication system provider. The computing system may be connected via signal exchange means to other computing systems via an interconnection system such as a wide area network, a local area network, or the global interconnection system commonly referred to as the Internet. The provider optionally provides as a feature of the system a portal or website that users, including signed item purchasers or potential purchasers, individual celebrities, parties with security interests in signed items, or the like, may access. That access is controlled by the provider who provides unique security codes for such accessing. Further, the computing system is configured to allow parties seeking access to the database to access only those items for which they have the visible code information. The provider remains the only party enabled to observe the embedded code.

While the invention has been described with reference to a particular example embodiment, it is intended to cover all modifications and equivalents as described in the following claims.

What is claimed is:

1. A process for verifying and authenticating the autograph of an individual, the process comprising the steps of:
   a. providing to the individual one or more items to be autographed and having the individual autograph each of the one or more items in the presence of a representative of a verification system provider;
   b. generating for each of the one or more items a label to be applied to the one or more autographed items, wherein each said label is tamper-proof;
   c. creating as part of each said label a first code providing unique identifying information related to the particular autographed item and the individual, wherein said code is visible; and
   d. creating as part of each said label a second code providing unique identifying information, wherein said second code is not visible with the naked eye.

2. The process as claimed in claim 1 wherein the step of generating each said label is performed prior to having the individual autograph the one or more items.

3. The process as claimed in claim 1 wherein the step of generating each said label is performed while the individual autographs the one or more items.

4. The process as claimed in claim 1 wherein said second code is embedded in a hologram depiction of each said label.

5. The process as claimed in claim 1 further comprising the step of inserting said unique identifying information into a database.

6. The process as claimed in claim 5 wherein said database is configured to be accessed by said verification system provider to confirm or refute the authenticity of an autograph by the individual based upon receipt from a user of said first code.

7. The process as claimed in claim 6 further comprising the step of scanning the label of the item offered for autograph authenticity and detecting said second code.

8. The process as claimed in claim 5 further comprising the step of enabling the individual to access the database to review said unique identifying information for one or more items for which the individual has said first code.

9. The process as claimed in claim 8 further comprising the step of enabling an item purchaser to retain said verification system provider to access said database to review said unique identifying information for one or more items for which the purchaser has said first code.

10. The process as claimed in claim 5 wherein said verification system provider manages a website accessible through an interconnected computer system, wherein said website includes access to said database, wherein said database is accessible via said website by users.

11. The process as claimed in claim 1 wherein each said label includes a pixelated kinetic matrix representing a unique image associated with said verification system provider thereby providing counterfeit protection for each label.

12. The process as claimed in claim 1 further comprising the step of obtaining from the individual a signed statement identifying the one or more items autographed, the date and location of the autographing, and a reference to each said label.

13. The process as claimed in claim 1 wherein each said unique identifying information includes alphanumeric coding uniquely associated with each of the one or more autographed labels.

14. The process as claimed in claim 13 wherein said unique identifying information includes the name of the individual, the date and location of the autographing, and a sequential identifier unique to each said label.

* * * * *